United States Patent

Mosburger

[11] Patent Number: 5,925,209
[45] Date of Patent: Jul. 20, 1999

[54] PROCESS AND DEVICE FOR PRODUCING CORRUGATED BOARD

[75] Inventor: Hans Mosburger, Weiherhammer, Germany

[73] Assignee: BHS Corrugated Maschinen und Anlagenbau GmbH, Weiherhammer, Germany

[21] Appl. No.: 08/894,700

[22] PCT Filed: Feb. 1, 1996

[86] PCT No.: PCT/DE96/00159

§ 371 Date: Oct. 6, 1997

§ 102(e) Date: Oct. 6, 1997

[87] PCT Pub. No.: WO96/26835

PCT Pub. Date: Sep. 6, 1996

[30] Foreign Application Priority Data

Feb. 27, 1995 [DE] Germany .......................... 195 06 777

[51] Int. Cl.⁶ ...................................................... B31F 1/28
[52] U.S. Cl. .......................... 156/292; 156/205; 156/210; 156/470; 156/499

[58] Field of Search ...................................... 156/205, 210, 156/356, 462, 470, 471, 472, 583.1, 292, 499

[56] References Cited

U.S. PATENT DOCUMENTS

| 782,558 | 2/1905 | Hahn | 156/470 |
|---|---|---|---|
| 1,005,836 | 10/1911 | Hinde | 156/470 |
| 4,059,474 | 11/1977 | Coburn | 156/356 |
| 5,122,220 | 6/1992 | Seki | 156/470 |

FOREIGN PATENT DOCUMENTS

| 155766 | 9/1985 | European Pat. Off. . |
|---|---|---|
| 179395 | 4/1986 | European Pat. Off. . |

*Primary Examiner*—Richard Crispino
*Attorney, Agent, or Firm*—Dennison, Meserole, Scheiner & Schultz

[57] ABSTRACT

In a process for manufacturing corrugated cardboard, corrugated cardboard is produced by gluing several individual webs (10, 11, 31) to each other by their mutually opposite surfaces. Several individual webs (10, 11, 31) are conveyed to an assembly point (A) and then moved over a heating device (38). The distance between the glue application points (B, C) and the assembly point (A) of the individual webs (10, 11) varies according to the speed of the webs.

8 Claims, 1 Drawing Sheet

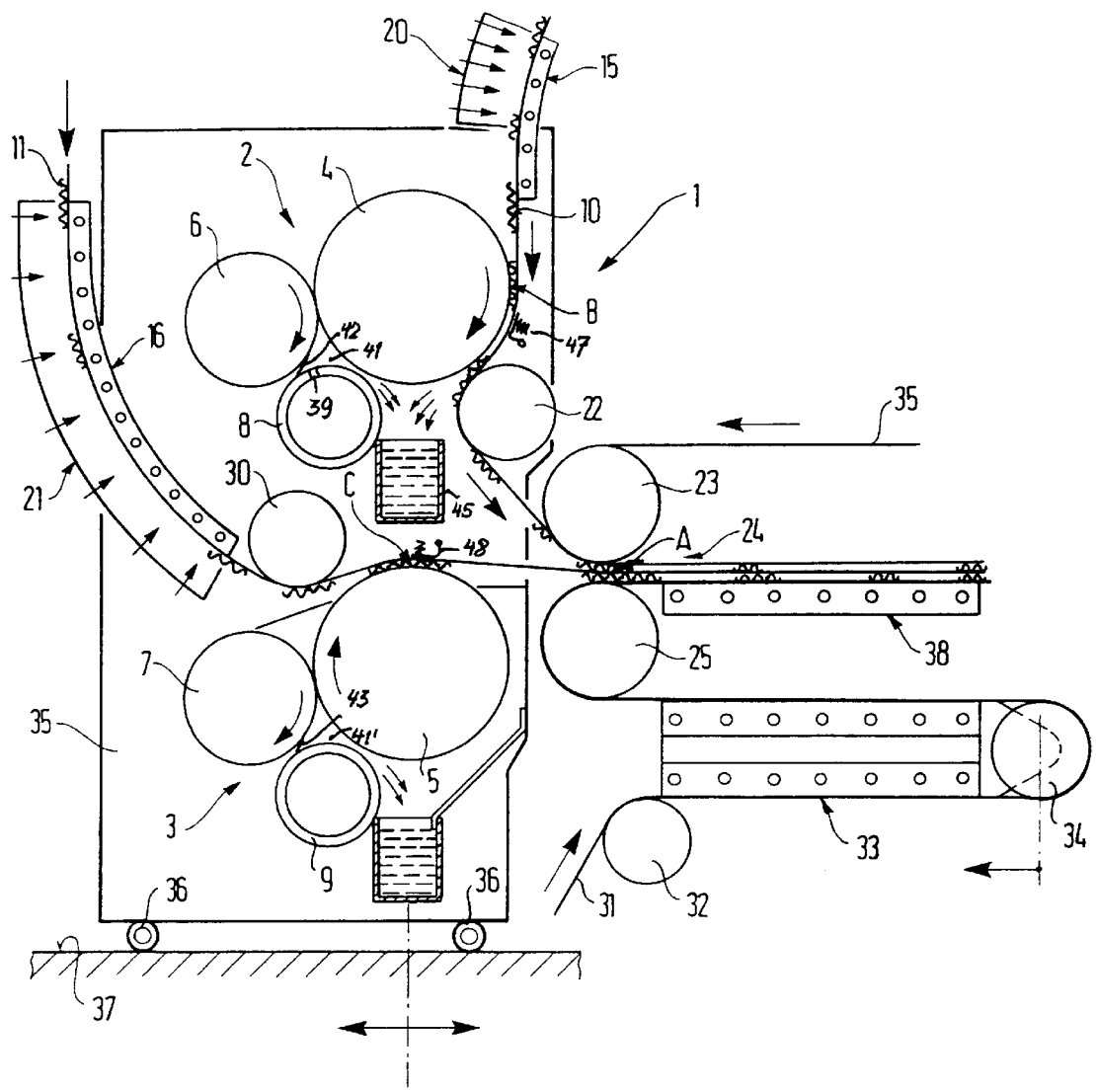

PROCESS AND DEVICE FOR PRODUCING CORRUGATED BOARD

BACKGROUND OF THE INVENTION

The invention relates to a process for producing corrugated board, as well as a device for carrying out this process.

It is known to produce corrugated board by bringing together a number of constituent webs together and gluing them to one another. For example, with a double-double corrugated board, three constituent webs, namely two constituent webs of unilateral corrugated board and one smooth cover web are brought together. It is known to supply these constituent webs to a single junction point at which a heating device possibly adjoins a conveyor belt. In this known manufacturing process, it is disadvantageous that the spacings between the adhesive application points for the constituent webs and the junction point for the constituent webs are unnecessarily great. The required heat entry into the constituent webs and the residual heat in the region of the junction point of the constituent webs is usually insufficient. Furthermore, the adhesive mechanisms and thus the adhesive application point are disposed spaced apart from the junction point of the constituent webs, independently of the web speed. With increased web speed, there is thus the danger that the moisture removal from the adhesive application is insufficient before the constituent webs reach the junction point. A favorable gluing together of the constituent webs then requires an unnecessarily long heating device via which the glued-together constituent webs must be guided. At a lower web speed, too much moisture is removed from the adhesive. The adhesion is inadequate.

SUMMARY OF THE INVENTION

The object of the invention is to establish a process and a device which make it possible to assure the optimal moisture removal from the constituent webs even at different web speeds and to assure the shortest possible spacing between the preheating device and the adhesive application point as well as between the adhesive application point and the junction point of the constituent webs. Furthermore, the device should have a compact design.

The invention attains the object of assuring the optimal moisture removal of the adhesive application even with changeable web speed by virtue of the fact that the spacing between the adhesive application point and the junction point is changed as a function of the web speed.

This achieves the advantage that for the optimal moisture removal, the spacing between the preheating device and the adhesive application point of the constituent web and the junction point of the constituent web can be selected to be as short as necessary, depending on the web speed. The heating device that adjoins the junction point of the constituent webs can then be kept as short as possible.

According to one embodiment of the invention, a number of constituent webs are conveyed to a single junction point. This produces a compact design of the device.

According to another embodiment of the invention, the adhesive mechanisms for the constituent webs are disposed one above the other. It is furthermore possible to more simply embody the movement or position changing of the adhesive mechanisms and therefore of the adhesive application point in relation to the junction point of the constituent webs. In order to achieve the most compact design possible and to thus achieve optimal spacings, a corresponding structure of the adhesive mechanisms is required.

In order to improve the heat entry into the constituent web or into the board web to be glued, the constituent webs are heated from both of their outer sides before and/or after the adhesive application.

BRIEF DESCRIPTION OF THE DRAWINGS

The invention will be explained in detail below in conjunction with the accompanying drawing showing a side view schematic representation of the device for manufacturing a corrugated board web out of a number of constituent webs.

DESCRIPTION OF THE PREFERRED EMBODIMENTS

The device 1 provides adhesive mechanisms 2, 3, preferably disposed one above the other. The adhesive mechanisms 2, 3 have a design that is not explained in detail. They have adhesive transfer rolls 4, 5 that are driven in the indicated arrow direction. These cooperate with metering rolls 6, 7. The metered adhesive application is taken by the adhesive transfer rolls 4, 5 and conveyed to the constituent webs 10, 11. The adhesive supply is carried out via stationary tubes 8, 9 that are filled with adhesive. Excess adhesive is wiped away from the metering rolls 6, 7 via blades 42, 43 and supplied to a pump via catch channels 45, 46. The adhesive can emerge via openings 39, 40 in the tubes 8, 9 into the nip regions 41, 41'. It can first contact the adhesive transfer rolls 4, 5 and is metered by the metering rolls 6, 7. The constituent webs 10, 11 are unilateral corrugated board webs. They are comprised of a cover web and a corrugated web. The constituent webs 10, 11 rest with their corrugated webs against the adhesive transfer rolls 4, 5 and are pressed uniformly via compression elements 47, 48. By means of this, the adhesive is transferred from the adhesive transfer rolls 4, 5 onto the apexes of the corrugated webs.

The constituent webs 10, 11, which are arriving in the indicated arrow directions are guided via preheating devices 15, 16. These can, for example, be curved segments that are heated. They heat the cover webs of the constituent webs 10, 11. In addition, a heating-device 20, 21 can be provided that heats the other, external side of the constituent web 10, 11, i.e. the corrugated web. For example, a steam chamber can be used for this purpose.

The constituent web 10 is then supplied to the adhesive transfer roll 4 via a deflecting roll 22, which is disposed so that adhesive being sprayed from the constituent web 10 and from the adhesive transfer roll 4 can be captured by the catch channel 45. In the lower adhesive mechanism 3, the sprayed adhesive is captured by a water-cooled adhesive skirt 50 and supplied to the catch channel 46. Then, the constituent web 11 reaches the stationary junction point A for the constituent webs 10, 11, which is constituted by the roll pair 24. The rolls 22, 23, and 25 can be heated.

The constituent web 11 is likewise supplied via the preheating device 16, which has a heating device 21, e.g. in the form of a steam pressure chamber, and via a deflection roll 30 to the adhesive transfer roll 5 in the indicated arrow direction. After adhesive application, it arrives at the junction point A of the roll pair 24. The roll 30 can also be heated.

The adhesive mechanism 3 is embodied in approximately the same way as the adhesive mechanism 2 and is not described further.

In the constituent web 11, the corrugated web is likewise oriented toward the adhesive transfer roll 5.

Another constituent web 31, e.g. a smooth cover web, is supplied via a deflection roll 32 in the indicated arrow direction via a heating device 33, which can be comprised, for example, of parallel heating plates disposed one above the other. A deflection roll 34 is provided on one end of the heating device 33. In this manner, the heating device 33 carries out a two-sided heating of the cover web which constitutes the constituent web 31.

The constituent web 31 travels from the heating device 33 to the bottom deflection roll 25 of the roll pair 24, partially winds around this roll and as a bottom constituent web, constitutes the cover web for the unilateral corrugated board web disposed above it, above which in turn, the other unilateral corrugated board web is disposed, whose corrugated web is associated with the cover web disposed beneath it.

In a conventional manner, the deflection roll 23 can guide a conveyor belt 35, which extends above the heating device 38 for the constituent webs to be glued.

The adhesive mechanisms 2, 3 as well as the heating devices 15, 16, 20, 21, and the deflection rolls 22, 30 are fastened to lateral plates 35.

These can be moved in an adjustable manner via rollers 36 on tracks 37.

Preferably the adhesive transfer rolls 4, 5 are disposed with their central axes in a vertical plane. When the rolling rack plates 35 are moved, the spacings of the adhesive transfer points B, C in relation to the junction point A of the constituent webs 10, 11 are changed. This change can be produced by means of corresponding movement as a function of web speed. The movement can be selected manually, but can also occur automatically as a function of web speed.

What is claimed is:

1. A process for producing corrugated board, comprising the steps of:
   a) preheating a surface of each of a plurality of webs using a preheating device for each of said webs;
   b) applying an adhesive coating to a surface of each of the plurality of webs at an adhesive application point using an adhesive application device for each of said webs downstream from the preheating device;
   c) adhering together facing surfaces of said webs at a junction point at a distance from each adhesive application point to produce a corrugated board, at least one of said facing surfaces having an adhesive coating thereon;
   d) heating the corrugated board;
   e) determining speed of travel of the webs; and
   f) moving the preheating devices and corresponding adhesive application devices so as to adjust the distance between the adhesive application devices and the junction point on the basis of the speed of travel of the webs.

2. The process according to claim 1, wherein the adhesive application devices are arranged one above another.

3. The process according to claim 2, wherein the distance between the adhesive application devices and the junction point is adjusted longitudinally.

4. The process according to claim 1, wherein the webs are heated on both surfaces before the adhesive application.

5. A device for producing corrugated board by adhering together a plurality of webs, comprising:
   a) a plurality of adhesive coating devices for coating a face of a plurality of webs;
   b) a plurality of web preheating devices, each arranged upstream of one of said adhesive coating devices;
   c) means for adhering together a plurality of webs having a face coated with adhesive at a junction point which is spaced from the adhesive coating devices by a distance, to form corrugated board;
   d) a heating device arranged downstream of the junction point, for heating the corrugated board;
   e) means for moving the web preheating devices and corresponding adhesive application devices as a unit to thereby adjust the distance depending on the speed of travel of the web.

6. The device according to claim 5, wherein the plurality of adhesive coating devices is arranged one on top of another.

7. The device according to claim 5, wherein the preheating devices heat opposite faces of each web.

8. The device according to claim 5, wherein preheating devices and a corresponding adhesive coating devices are mounted on a single plate.

* * * * *